United States Patent
Best et al.

[11] Patent Number: 5,636,728
[45] Date of Patent: Jun. 10, 1997

[54] EXPANDABLE CONVEYOR WITH POWER MODULE

[75] Inventors: John W. Best; James D. Walker, both of Jonesboro, Ark.

[73] Assignee: Northstar Industries, Inc., Jonesboro, Ark.

[21] Appl. No.: 349,444

[22] Filed: Dec. 5, 1994

[51] Int. Cl.$^6$ .................................................. B65G 13/02
[52] U.S. Cl. ...................................... 198/782; 193/35 TE
[58] Field of Search ........................ 198/782; 193/35 TE; 414/392, 398

[56] References Cited

U.S. PATENT DOCUMENTS

| | | | |
|---|---|---|---|
| 1,725,740 | 8/1929 | Schulte | 198/788 |
| 1,959,735 | 5/1934 | Phillips | 193/35 TE |
| 2,576,217 | 11/1951 | Eggleston | 198/812 X |
| 2,815,849 | 12/1957 | Zumbrunnen | 198/812 |
| 2,826,290 | 3/1958 | Barski | 198/812 |
| 2,915,165 | 12/1959 | Bell | 193/47 |
| 2,988,190 | 6/1961 | Tucker | 193/35 TE |
| 3,216,552 | 11/1965 | Lister, Jr. | 193/35 TE X |
| 3,242,342 | 3/1966 | Gabar | 198/370.07 X |
| 3,294,216 | 12/1966 | Girardi | 198/812 |
| 3,596,785 | 8/1971 | Weatherford | 198/812 |
| 3,780,843 | 12/1973 | McGovern, Jr. et al. | 193/35 TE |
| 3,876,060 | 4/1975 | Stease | 193/35 TE X |
| 4,260,053 | 4/1981 | Onodera | 198/812 |
| 4,852,712 | 8/1989 | Best | 193/35 TE |
| 5,042,644 | 8/1991 | Davis | 198/781.1 |
| 5,060,785 | 10/1991 | Garrity | 198/781.1 X |
| 5,147,025 | 9/1992 | Flippo | 198/782 |
| 5,224,584 | 7/1993 | Best et al. | 198/782 |

FOREIGN PATENT DOCUMENTS

| | | | |
|---|---|---|---|
| 0372130 | 4/1969 | U.S.S.R. | 198/812 |
| 1407861 | 7/1986 | U.S.S.R. | 198/812 |

*Primary Examiner*—David A. Bucci
*Attorney, Agent, or Firm*—James L. Ewing, IV; Kilpatrick Stockton LLP

[57] ABSTRACT

Power modules for expandable conveyors. The power modules contain motor driven rollers whose operation may be speed, direction and otherwise controlled as desired. The module connects to the end of an expandable conveyor, such as a conventional scissors conveyor, to allow repositioning, expansion and contraction of the conveyor with minimum risk of overexertion, strain and injury. Rollers may be positioned along the top surface of the power module as an extension of the conveyor for conveying items to ultimate destination. Gripping surfaces may be provided which act in combination with swivel mounted wheels to allow efficient and effective steering of the power module and the conveyor. The gripping surfaces may be located conveniently in the vicinity of a control panel for controlling actuation of the motor and the drive wheels. The power module accordingly allows efficient and effective repositioning, expansion and contraction of expandable roller conveyors that help meet increasing ergonomic and worker welfare considerations being entertained and implemented by enlightened employers.

5 Claims, 1 Drawing Sheet

EXPANDABLE CONVEYOR WITH POWER MODULE

This invention relates to expandable conveyors which may be expanded and retracted using powered modules for ergonomic and other reasons.

BACKGROUND OF THE INVENTION

Expandable conveyors are conventionally employed to convey items such as corrugated containers of product in warehouses, manufacturing facilities and other locations. For example, expandable conveyors may be employed at the terminus of conveyor branches in a warehousing rigid and fixed conveyor distribution system to extend from the branches of the central conveyor system in flexible fashion to accommodate various trucks and shipping containers. The conveyors may be moved, for instance, back and forth, left and right in order to accommodate the location in which a truck is parked and to direct the stream of items to the particular portion of the truck being filled.

Expandable conveyors often take the form of scissors or "lazy tongs" structures. These conventionally contain a pair of scissor structures which act as expandable load bearing members, between which a plurality of skate wheel or elongated rollers spans. The scissors members are connected, conventionally, at substantially their top and bottom portions and their midportions to each other to provide proper linkage, expandability, and strength. Various connections may obviously be omitted, such as midpoint connections, for manufacturing efficiency and other purposes.

Such expandable roller conveyors are disclosed in, for instance, U.S. Pat. No. 4,852,712 issued Aug. 1, 1989 to Best entitled "Conveyor" which discloses an extensible lazy tong conveyor. U.S. Pat. No. 5,224,584 issued Jul. 6, 1993 to Best, et al. entitled "Expandable Powered Conveyors" discloses power conveyors in which the power units are located external to the rollers and connected to them via a number of chains or belts. U.S. patent application Ser. No. 08/022,012 and now abandoned to Best, et al. filed Feb. 24, 1993 entitled "Controllably Powered Roller Conveyors" discloses powered lazy tong conveyors in which the power units are located within the rollers. All of these patent documents are incorporated herein by this reference.

It is often the case that expandable conveyors need to be repositioned during use, including when loaded with items which may weigh hundreds of pounds. Although conventional expandable conveyors employ legs with casters or rollers for easy repositioning on, for instance, a warehouse floor, workers on occasion experience overexertion, strain and sometimes injury as a result of improper efforts to move a conveyor loaded with product. Accordingly, efficiency suffers as the conveyor remains in one place during the process of loading a truck, rather than continually being repositioned to empty portions of the truck. Alternatively, workers experience overexertion, strain or injury in attempting to do the repositioning.

SUMMARY OF THE INVENTION

The present invention provides a powered module which may be connected to an expandable conveyor for powered repositioning, expansion and contraction of the conveyor. The module is attached to an end of an expandable conveyor and contains one or more wheels for providing traction between the conveyor and the floor. The wheel is coupled, via chain, belt or gear drive, to a suitable motor which is in turn controlled by control circuits. The control circuits allow for variations in speed and direction of the motor; alternatively, such adjustments may be accomplished using appropriate mechanical interfaces such as reduction gearing, clutches and other conventional means.

The power module may also contain swivel mounted wheels and appropriate gripping surfaces for efficient and effective steering during the repositioning process. The gripping surfaces may be conveniently located adjacent to the motor controls, so that one person can steer and operate the power module with ease, comfort and efficiency.

The module frame may also include, on its upper surface, a number of rollers, which may be similar in structure and spacing to rollers on the expandable conveyor in its typical position. The power module in that sense serves as a conveyor extension.

It is accordingly an object of the present invention to provide devices for powered repositioning of expandable conveyors.

It is an additional object of the present invention to provide devices for automatically expanding, contracting and repositioning conveyors which may be steered and controlled by one person.

It is a further object of the present invention to provide powered devices for expanding, contracting and repositioning conveyors which themselves contain rollers on their upper surfaces so as to form extensions of the expandable conveyors.

It is a further object of the present invention to reduce any exertion, strain and injury occasioned during repositioning of conventional expandable conveyors, by providing powered means.

Other objects, features and advantages of the present invention will become apparent with respect to the remainder of this document.

DETAILED DESCRIPTION OF THE DRAWINGS

Figure 1:
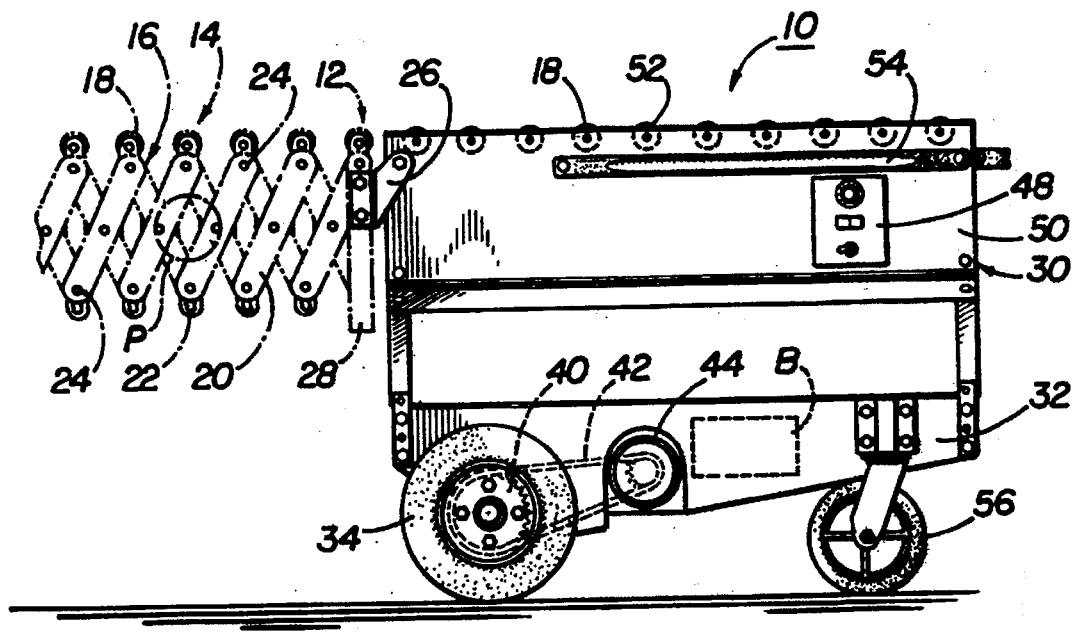
FIG. 1 is a side elevational view of a power module according to a preferred embodiment of the present invention.

FIG. 1 shows a power module 10 according to a preferred embodiment of the present invention. Module 10 connects to one end 12 of a conventional scissors conveyor 14 such as is disclosed in U.S. Pat. Nos. 4,852,712 and 5,224,584 and application Ser. No. 08/022,012 referred to above which are incorporated into this document by reference. Such conveyors contain a pair of scissors structures 16 which are spanned by a plurality of rollers 18. The rollers may be elongated rollers or skate wheel rollers. The elongated rollers may be powered by internal or external power sources as disclosed in U.S. Pat. Nos. 4,852,712 and 5,224,584 and application Ser. No. 08/022,012 referred to above. See Power Device P in FIGS. 1 and 2. Each scissors structure 16 contains a plurality of scissor bars 20 which are connected substantially at their ends and, if desired, at their midpoints or some of their midpoints. The connections allow the bars 20 to swivel with respect to one another so that structures 16 expand and contract but yet provide vertical support for rollers 18. Each scissors structure 16 may include a plurality of perpendicular retainer bars 22, each of which is connected in sliding or partially sliding relationship to an upper and a lower scissor bar 20 connection 24.

The scissors conveyor 14 may, but need not, contain a plurality of legs for providing support, as disclosed in the above-referenced patents and mounted to the conveyor in conventional fashion.

Figure 2:
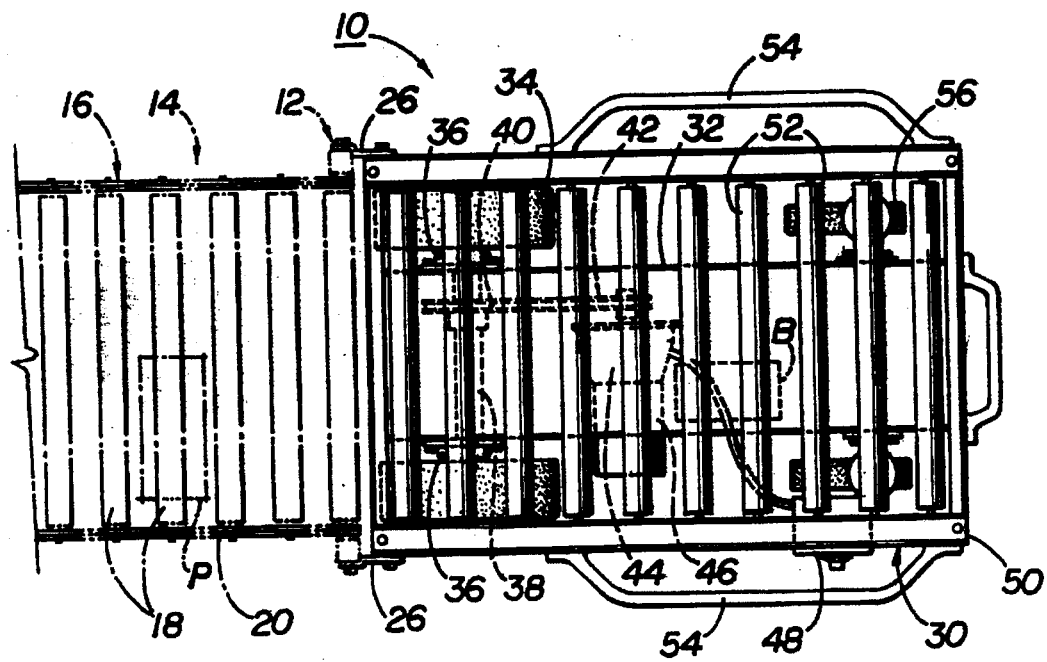
FIG. 2 is a top plan view of the power module of FIG. 1.

Conveyor 14 may be mounted to power module 10 in swivel fashion as shown FIGS. 1 and 2 using brackets 26 or as otherwise desired. Brackets 26 may be connected to a vertical member 28 forming part of scissors structure 16 and spanning upper and lower scissor bar connections 24 as shown in FIG. 1.

Module 10 as shown in FIG. 10 comprises a frame 30 which may be fashioned of suitable angle members, sheet metal and desired fasteners, or from other materials as desired. In the embodiment shown in FIG. 1, frame 30 includes a pair of substantially vertical strength members 32 which are disposed sufficiently far enough apart to mount to drive wheels 34 such as by bearing units 36. Drive wheels 34 and bearing units 36 may be of convention structure and materials, and drive wheels 34 may be connected by an axle 38 if desired. Axle 38 carries sprocket 40. Alternatively, sprocket 40 may be connected directly to a drive wheel 34, or in any other desired fashion. Sprocket 40 may include a clutch (not shown) for engagement and disengagement of a drive motor. In the illustrated embodiment as shown in FIGS. 1 and 2, a chain 42 connects sprocket 40 with a gear reduction unit 44 mounted to a suitable motor 46. Reduction unit 44 and motor 46 are mounted as desired to frame 30. Reduction unit 44 may, if desired, contain a transmission for controlling speed and/or direction of rotation of drive wheels 34. Any desired combination of belts, gears or other conventional transmission linkage may be used to transmit power from motor 46 to wheels 34.

Motor 46 may be electrical and powered by a battery or external mains in conventional fashion. See Battery Device B in FIGS. 1 and 2. A potentiometer, suitable switching circuitry and other control circuity which may, but need not be, embodied in automatic control circuits of conventional fashion, may be interposed for controlling motor 46 and thus rotation of drive wheels 34 and expansion and contraction of conveyor 14. In the embodiment shown in FIGS. 1 and 2, the control circuits are located so that they are easily accessed by a user who is repositioning the conveyor 14. Control panel 48, which may contain these circuits, is shown in both of those figures mounted in the upper part of frame 30. Conventional battery means, which may be rechargeable, may be provided.

The upper portion of power module 10 may contain upper frame structure 50 connected to strength members 32. Upper frame structure 50 may be formed of suitable angle and sheet metal members as desired.

Upper frame structure 50 may carry a plurality of rollers 52 which may, but need not be, similar to or the same as those used in scissors conveyor 14. They may be any type of roller conventionally used in conveyors, such as skate wheel rollers, internally or externally powered elongated rollers, nonpowered elongated rollers, or any rollers as described in the above-referenced patent rights or otherwise conventionally used. The rollers may be spaced at any desired interval.

Power module 10 may also include at least one gripping surface 54 which may, but need not be, in the form of one or more handles as shown in FIGS. 1 and 2. These gripping surfaces 54 may be located and positioned on the power module 10 frame 30 at any desired location for convenient steering of power module 10. Steering of the module is enhanced using one or more swivel mounted wheels 56 which may be connected in conventional fashion to strength members 32 or any other desired portion of frame 30. Gripping surfaces 54 may be conveniently located in the area of control panel 48 so that the operator may easily steer and control power module 10 with a minimum of reaching or other effort.

The foregoing is provided for purposes of illustration and disclosure of a preferred embodiment of the present invention. Changes, deletions, additions and modifications may be made to the structures disclosed above without departing from the scope or spirit of the present invention.

What is claimed is:

1. An expandable conveyor, comprising:

a. an expandable conveyor structure which includes a pair of scissor structures, each comprising complementary pairs of scissor bars most of which are connected to each other substantially at their midpoints, upper and lower portions, and a plurality of rollers spanning upper portions of the retainer bars; and b. a power module connected to the expandable conveyor structure in a swivel relationship using a plurality of brackets, comprising a frame, a plurality of rollers attached to upper portions of the frame in a manner that the rollers are at substantially the same height as the rollers on the expandable conveyor structure, at least one power wheel connected to the frame, at least one swivel mounted steering wheel connected to the frame, a motor connected to the frame and coupled to the power wheel, a power supply connected to the motor including a circuit for allowing the speed and direction of the motor, and thus the expansion and contraction of the conveyor, to be controlled, a control panel coupled to said circuit for allowing a user to control repositioning, expanding and contracting of the conveyor, and at least one gripping surface attached to the frame for ease of repositioning, expanding or contracting the conveyor, and in which the control panel is mounted in the vicinity of the gripping surface in order to allow the operator of the conveyor to easily steer and control the power module and the conveyor with a minimum of reaching and other effort.

2. An expandable conveyor according to claim 1 in which at least some of the rollers on the expandable conveyor structure are powered.

3. An expandable conveyor according to claim 1 further comprising a control panel on the module which includes controls for adjusting the speed and direction of the motor.

4. An expandable conveyor according to claim 1 in which the direction and actuation of the motor are at least partially automatically controlled.

5. An expandable conveyor according to claim 1 in which the module contains a battery for powering the motor.

* * * * *